Patented July 22, 1952

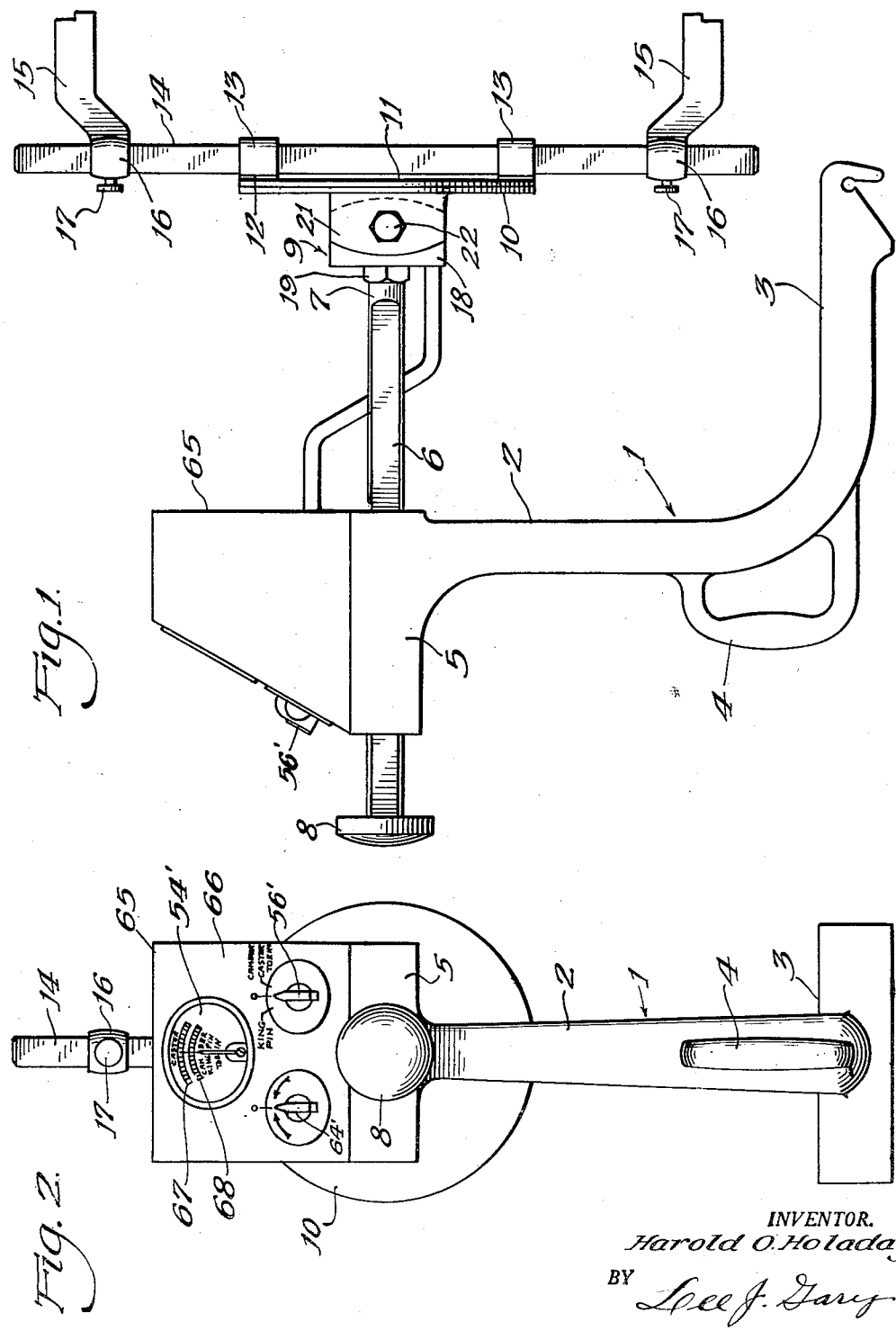

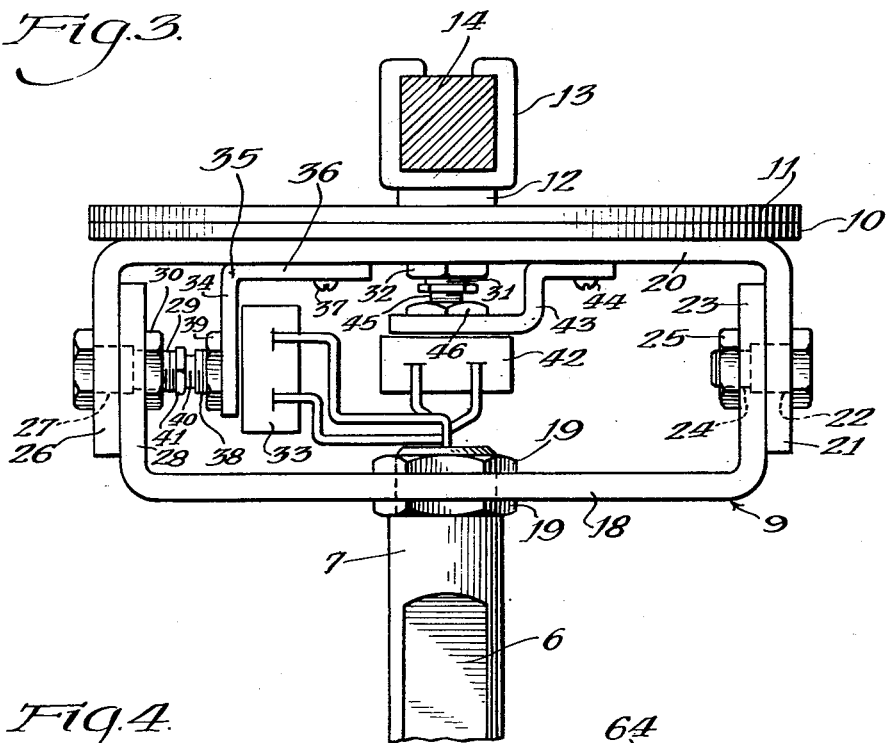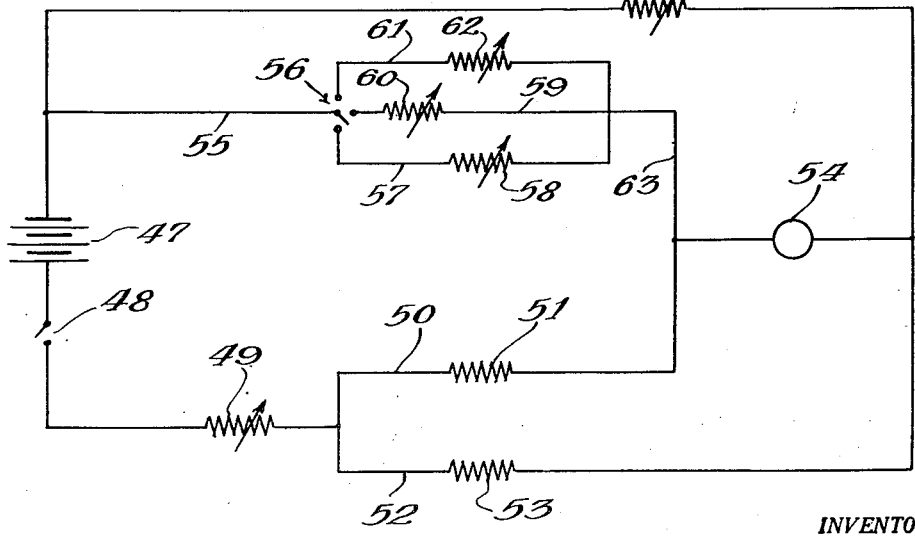

2,603,881

UNITED STATES PATENT OFFICE 2,603,881

WHEEL ALIGNMENT GAUGE

Harold O. Holaday, Rock Island, Ill., assignor to Bear Manufacturing Company, Rock Island, Ill., a corporation of Delaware Application May 20, 1947, Serial No. 749,141

2 Claims. (Cl. 33—203.15)

This invention relates to improvements in wheel alignment gauges, and refers specifically to a gauge for measuring the alignment angles of the front wheels of an automobile, the gauge being characterized in that the angular alignment measurements are indicated electrically.

One of the objects of the present invention resides in the provision of mechanism for quickly and conveniently indicating the magnitude of the alignment angles of the front wheels of a motor vehicle.

Another object of the invention resides in means for quickly and conveniently adjusting the measuring device to a datum or zero position preparatory to, or during, the measuring of said alignment angles.

A further object of the invention resides in the employment of an electrical bridge circuit whereby by the use of proper constants, the ratio arms of the bridge may be designed to give substantially any desired degree of accuracy.

Other objects and advantages of the present invention will be apparent from the accompanying drawing and following detailed description.

In the drawings,

Fig. 1 is a side elevational view of my wheel alignment gauge.

Fig. 2 is a front elevational view of the gauge shown in Fig. 1.

Fig. 3 is a detailed top plan view of the control portion of the gauge.

Fig. 4 is a schematic wiring diagram of the circuit employed in my gauge.

Referring in detail to the drawings, 1 indicates a standard which may comprise a vertical arm 2 and a horizontal arm 3. The standard is adapted to be mounted upon the usual turning radius plate (not shown) upon which the front tire of the vehicle whose front wheel is to be measured is supported. A handle 4 is mounted upon the standard 1 for the convenient manipulation of the standard.

The upper end of the vertical arm 2 of the standard 1 carries a block 5 in which a rod 6 of square cross-section throughout the major portion of its length is slidably positioned. A portion 7 of the rod 6 is of round cross-section whereby by moving said rod to its extreme left position, as viewed in Fig. 1, said rod may be rotated within the block 5. However, during the measurement operation, as will hereinafter be described, and rod 6 is non-rotatably positioned within block 5. A knob 8 is carried at the end of the rod 6 and functions as a convenient means for manipulating said rod.

At the opposite end of the supporting rod 6, a control mechanism 9 is mounted. The mechanism 9 carries on its outer face a disk 10 (Fig. 3), and positioned adjacent the outer face of the disk 10 is a similar disk 11, the disk 11 being rotatable with respect to the disk 10. The disk 11 carries a bracket 12 which, in turn, is provided with a pair of clips 13 adapted to carry a square-sectioned rod or gauge bar 14. The rod or gauge bar 14 carries a wheel arm 15 adjacent each end thereof, each of said wheel arms being provided with a sleeve 16, which has a square-sectioned opening conformable with the bar 14 and which is slidable upon said bar. A set screw 17 is threadedly positioned in each sleeve 16 and functions to lock each wheel arm 15 in a desired position along the length of the rod 14.

Referring particularly to Fig. 3, the control mechanism 9 comprises a U-shaped bracket 18, which is rigidly mounted upon the end portion of the slidable bar 6, being secured thereto by means of lock nuts 19 which are threadedly engaged upon the bar 6 on each side of the bracket 18.

A similar U-shaped bracket 20 is pivotally mounted upon the bracket 18. Arm 21 of bracket 20 is provided with an enlarged aperture in which the enlarged shank of a screw 22 is loosely positioned. The adjacent arm 23 of the bracket 18 is also apertured throughout a portion of its thickness to receive the enlarged portion of the screw 22. The end of the screw 22 is of restricted diameter as shown best at 24 in Fig. 3, the restricted portion being threaded to receive nut 25. The arrangement is such that the screw 22 is mounted rigidly upon arm 23 of the bracket 18 and the arm 21 of bracket 20 can rotate relative thereto about the enlarged portion of the screw 22.

Arm 26 of bracket 20 is similarly apertured to receive the enlarged shank of a screw 27 which is loosely positioned with respect to said arm. Arm 28 of bracket 18 is also apertured throughout a portion of its thickness to conform with the enlarged portion of the shank of screw 27. The remaining portion of the screw 27 is of restricted diameter and is provided with external threads 29, upon which lock nut 30 is engageable. The arrangement is such that the screw 27 may be held rigid upon arm 28 by means of the lock nut 30.

As has been hereinbefore described, the bar 14 is rigid with respect to the disk 11. An externally and internally threaded sleeve is rigidly secured to the disk 11 and passes loosely through apertures (not shown) provided in disk 10 and bracket 20. A nut 32 threadedly engages the exterior of sleeve 31 and frictionally holds disk 11, disk 10 and bracket 20 in assembled relationship, permitting, however, relative slidable movement of disk 11 with respect to disk 10 in a rotary fashion.

A variable resistance unit 33 is mounted upon one arm 34 of an angle shaped support 35, the opposite arm 36 of said support being secured to bracket 20 by means of a screw or the like 37. The resistance unit 33 carries an externally threaded sleeve 38 which passes loosely through an aperture (not shown) in arm 34, and a nut 39 functions to lock said sleeve rigidly upon the arm 34, thereby rigidly securing the resistance unit 33 upon the arm 34.

The variable resistance 33 is of the usual dial type having a rotatable contact arm (not shown) which changes the value of the resistance in accordance with the angular displacement of the contact arm. A screw 40 is mounted upon the end of the rotatable contact arm, said screw loosely projecting through the sleeve 38. The external portion of the screw 40 is threaded and is threadedly engageable with interior screw threads carried by the screw 27, and a lock nut 41 is threadedly mounted upon the exterior of the screw 40 whereby the screw 40 and the screw 27 are secured together as a unit.

It can readily be seen that inasmuch as the screw 40 is rigid with respect to the bracket 18, and that the resistance unit 33 is rigidly positioned with respect to the bracket 20, rotation of the bracket 20 about the screws 22 and 27, causes relative rotation of the screw 40 with respect to the resistance unit 33. In this manner the contact arm of the resistance unit is angularly displaced in proportion to the angular displacement of bracket 20 with respect to bracket 18.

A similar variable resistance unit 42 is rigidly mounted upon a support 43 which in turn is rigidly secured to bracket 20 by means of screw 44. The contact arm (not shown) of the variable resistance unit 42 is mounted upon screw 45, and a lock nut 46 threadedly engages the external threads of the screw 45 to securely position the resistance unit 42 upon the support 43.

The arrangement is such that when disk 11 is rotated with respect to disk 10, there is an angular displacement of the contact arm of the variable resistance 42 with respect to the resistance unit thereof. In view of the fact that the bar 14 is rigidly mounted with respect to the disk 11, the angular displacement of the bar 14 is proportional to the amount of resistance thrown into or taken out of the circuit in which the unit 42 is connected.

Referring particularly to Fig. 4, the electrical circuit employed in my invention is illustrated schematically. In this circuit a battery 47 is connected through switch 48 to a variable resistance 49. The opposite end of the variable resistance 49 is connected to an arm 50 which includes a fixed resistance 51. The same end of the variable resistance 49 is also connected to arm 52 which includes a fixed resistance 53. A galvanometer 54 is connected across the arms 50 and 52.

The opposite pole of battery 47 is connected by means of a conductor 55 to the movable arm of a three point selector switch 56. The switch 56 functions to connect the conductor 55 to circuit 57 which includes variable resistance 58 or to circuit 59 which includes variable resistance 60 or its circuit 61 which includes variable resistance 62. The common end of each of the circuits 57, 59 and 61 is connected to one side of the galvanometer 54 by means of conductor 63. The opposite side of the galvanometer 54 is connected through variable resistance 64 to the pole of the battery 47 which is common to the conductor 55.

A control cabinet 65 is supported upon the member 5 and carries a sloping panel 66 upon which is mounted meter 54′ corresponding to galvanometer 54, which is provided with two calibrated dials 67 and 68. A control knob 64′ is also mounted upon panel 66 and functions to vary the resistance 64. A second control knob 56′ is mounted upon the panel and provides means for operating the selector switch 56. The variable resistance 58 corresponds to the resistance contained in the resistance unit 33 and the variable resistance 62 corresponds to the resistance contained within the resistance unit 42.

It will be noted that the resistances together with the meter 54 and source of E. M. F. 47 are connected in the form of the usual resistance bridge of the Wheatstone type wherein resistance 53 is contained in one arm; resistance 51 is contained in another arm; resistance 64 is contained in a third arm; and, resistances 58, 60 or 62, selectively, are contained in the remaining arm. Resistance 49 is a control resistance which regulates the voltage applied to the bridge. Resistance 60 is a balancing resistance and is normally set to balance the bridge when connected into circuit whereby no current will flow through the meter 54. Resistances 49 and 60 are contained within cabinet 65 and are preset and are not varied during the making of the tests.

In adjusting the device, with the bar 14 disposed at right angles to the rod 6 and with the bar 14 in a vertical position, resistance 60 is connected into circuit by means of the selector switch 56. Resistances 64 and 60 are adjusted to obtain a "zero" reading upon the meter 54. With the bar 14 in this position a balanced reading will also be obtained when resistances 58 or 62 are connected into circuit. The fixed resistances 51 and 53 are so selected with reference to the voltage applied to the bridge, controlled by resistance 49, that normal variations of resistances 58 or 62 will maintain the current through meter 54 within its range.

Resistances 58 and 62 are so constructed that angular movement of the contact arms carried by the screws 40 and 45 respectively produces proportional changes in the resistances, and scales 67 and 68 are calibrated to interpolate these changes in resistances through the change of current in meter 54 in terms of degrees of angular displacement of caster, camber, king pin inclination and toe in.

To utilize the present invention to measure camber of the front wheels of an automobile, the front wheels of the vehicle are placed upon opposite turning radius plates. A gauge, as hereinbefore described, is mounted upon each of the turning radius plates and with the bar 14 of one of the gauges disposed vertically the support 6 is moved inwardly toward a front wheel and the arms 15 are adjusted so that the ends thereof contact the rim of the wheel. The selector switch, after switch 48 has been closed, is moved to its "camber" position, that is, resistance 58 of resistance unit 33 is placed in circuit. Bracket 20 will then be displaced about bracket 18 and, hence, the resistance within 33 (resistance 58) will be varied and, hence, the bridge will become unbalanced to a degree indicated upon meter 54 as interpolated by scale 68. In view of the fact that the bar 14 has been displaced from its normal or preset position, the displacement will be measured by virtue of the variation of the resistance 58 from its bridge-balancing position. Hence, the amount of camber, in degrees, can be read directly from scale 68.

To measure caster, the brakes of the vehicle are locked and the front wheel to be measured is turned toward the longitudinal center line of the vehicle through an angle of twenty degrees.

With the bar 14 in its vertical position and the selector switch set to its "caster" position, that is with resistance 58 (resistance unit 33) in circuit, the support 6 is moved inwardly toward the wheel and the wheel arms 15 are brought into contact with the rim of the wheel. The needle of the meter will be displaced by virtue of the canting movement of the bar 14. The knob 64' is then manipulated until the needle is returned to its "zero" position upon dial 67.

The support 6 is then moved rearwardly and front wheel being measured of the vehicle is turned outwardly from the longitudinal center line of the vehicle through an arc of twenty degrees. The support 6 is then again moved inwardly until the wheel arms 15 contact the wheel rim. The caster angle can then be read directly from scale 67.

To measure king pin angle, the brakes of the vehicle are locked and the front wheel to be measured is turned toward the longitudinal center line of the vehicle through an angle of twenty-five degrees. With the bar 14 in its vertical position and the selector switch set to its "king pin" position, that is with resistance 62 (resistance unit 42) in circuit, the support 6 is moved inwardly toward the wheel and the wheel arms 15 are brought into contact with the rim of the wheel. An index mark is placed upon the wheel rim where the wheel arms contacted said rim.

The support 6 is then moved rearwardly and the front wheel being measured on the vehicle is turned outwardly from the longitudinal center line of the vehicle through an arc of twenty-five degrees. The support 6 is then moved inwardly until the wheel arms 15 contact the wheel rim, the bar 14 being rotated to bring the arms in registration with the index marks previously placed upon the rim. The king pin inclination can be read directly from scale 68.

To measure toe-in, the support 6 is moved rearwardly until said support can be rotated. The support is then rotated until bar 14 is brought to a horizontal position and the support is then moved forwardly until the wheel arms 15 contact the rim of the front wheel. The knob 56' is turned to the "toe-in" position, that is resistance 58 (resistance unit 33) is in circuit. At this position the meter 54 will show a reading other than zero if the wheel has any degree of toe-in. The wheel is then moved from its original position until the meter shows a balanced condition of the circuit, that is, the meter reads "zero." The gauge on the opposite side of the vehicle is then used. With the bar 14 of said gauge in a horizontal position, the knob 56' is moved to "toe-in" position, that is resistance 53 (resistance unit 33) is placed in circuit. The support 6 is then moved forwardly until wheel arms 15 contact the wheel rim and toe-in is indicated in inches upon scale 68.

It is to be understood that broadly my invention is directed to a device for electrically indicating and measuring the alignment angles of the wheels of an automotive vehicle and for purposes of illustration a resistance bridge circuit is shown. However, the specific bridge circuit is not, per se, my invention and any of the usual bridge circuits can be employed where the variation in impedance caused by angular displacement of a variable impedance is interpolated by a current measuring device in terms of angular measure.

By "impedance" as used in the specification and claims is meant resistance, inductance or capacitance or combinations thereof, depending upon the particular type of bridge circuit and electric current employed.

I claim as my invention:

1. An automotive wheel alignment gauge comprising in combination, a standard adapted for movement toward and away from an automobile wheel, a support movably carried by said standard, a bracket carried upon said support, a second bracket pivotally mounted upon said first mentioned bracket, a gauge bar carried upon said second bracket for contacting spaced portions of the rim of a wheel when said support is moved relative to said standard, a resistance unit comprising two members rotatable relative to each other to change the resistance thereof in proportion to the rotatable displacement of the two members, one of said members being mounted upon said first bracket and one of said members being mounted upon said second bracket, a resistance bridge circuit, the resistance of said resistance unit being connected in one arm of said bridge circuit and balancing resistances connected in the remaining arms, a current measuring meter connected across said bridge, and calibrations on said meter for interpreting change in current caused by change in said first mentioned resistance in terms of angular displacement of said brackets relative to each other.

2. An automotive wheel alignment gauge comprising in combination, a standard, a support movably carried by said standard, a bracket mounted upon said support, a gauge bar, rotatable means for mounting said gauge bar upon said bracket, said gauge bar being adapted to contact the rim of a wheel at spaced portions thereof when said support is moved relative to said standard, a variable resistance unit comprising two members rotatable relative to each other to change the resistance of the resistance unit in proportion to the rotatable displacement of the two members, one of said members being mounted upon said bracket and the other member being connected to said rotatable means and being movable with said bar, a resistance bridge circuit, the resistance of said resistance unit being connected in one arm of said bridge circuit and balancing resistances being connected in the other arms of said bridge, a current responsive meter connected across said bridge, and calibrations on said meter for interpreting change in current caused by change in said first mentioned resistance in terms of angular displacement of said gauge bar relative to said bracket, and means for independently varying the resistance of one of the balancing resistances of said bridge.

HAROLD O. HOLADAY.

REFERENCES CITED

The following references are of record in the file of this patent:

UNITED STATES PATENTS

| Number | Name | Date |
|---|---|---|
| 1,859,222 | Rogers | May 17, 1932 |
| 2,036,458 | Carlson | Apr. 7, 1936 |
| 2,061,326 | Morse et al. | Nov. 17, 1936 |
| 2,198,523 | Adams | Apr. 23, 1940 |
| 2,210,970 | Bonell | Aug. 13, 1940 |
| 2,346,360 | Creagmile | Apr. 11, 1944 |
| 2,437,639 | Floyd | Mar. 9, 1948 |

FOREIGN PATENTS

| Number | Country | Date |
|---|---|---|
| 62,650 | Norway | July 1, 1940 |